(12) United States Patent
Errazquin

(10) Patent No.: US 10,165,731 B2
(45) Date of Patent: Jan. 1, 2019

(54) MECHANICAL DISCHARGER COMBINED WITH AN EXTRACTOR DEVICE FOR BULK PRODUCT STORED IN SILO-BAGS

(71) Applicant: Martin Errazquin, Buenos Aires (AR)

(72) Inventor: Martin Errazquin, Buenos Aires (AR)

( * ) Notice: Subject to any disclaimer, the term of this patent is extended or adjusted under 35 U.S.C. 154(b) by 0 days.

(21) Appl. No.: 15/708,128

(22) Filed: Sep. 19, 2017

(65) Prior Publication Data

US 2018/0077873 A1 Mar. 22, 2018

(30) Foreign Application Priority Data

Sep. 22, 2016 (AR) .............................. 20160102878

(51) Int. Cl.
*A01F 25/20* (2006.01)
*B65G 65/22* (2006.01)

(52) U.S. Cl.
CPC .............. *A01F 25/20* (2013.01); *B65G 65/22* (2013.01)

(58) Field of Classification Search
CPC ...................................................... A01F 25/20
USPC ........................................................ 414/412
See application file for complete search history.

(56) References Cited

U.S. PATENT DOCUMENTS

| 7,861,851 | B2* | 1/2011 | Dekoning | ............... | A01F 25/20 |
| | | | | | 198/308.1 |
| 7,997,849 | B2* | 8/2011 | Twiestmeyer | .......... | A01F 25/20 |
| | | | | | 241/101.742 |
| 8,251,630 | B2* | 8/2012 | Hilsabeck | .............. | B65G 53/48 |
| | | | | | 198/506 |
| 8,336,704 | B2* | 12/2012 | Dekoning | .............. | B65G 65/22 |
| | | | | | 198/300 |
| 8,602,710 | B2* | 12/2013 | Lambertini | ............. | A01F 25/20 |
| | | | | | 414/412 |
| 9,055,717 | B2* | 6/2015 | Stumpe | .................... | A01F 25/20 |
| 9,301,451 | B2* | 4/2016 | Zastrow | ................... | A01F 25/20 |
| 2012/0189413 | A1* | 7/2012 | Richiger | ................. | A01F 25/20 |
| | | | | | 414/310 |
| 2016/0219791 | A1* | 8/2016 | Dekoning | ........... | A01F 25/2027 |

* cited by examiner

*Primary Examiner* — Jonathan Snelting
(74) *Attorney, Agent, or Firm* — Hoglund & Pamias, PSC; Roberto J. Rios

(57) ABSTRACT

A mechanical discharger (a) combined with an extractor device (b) of the bulk product (c) stored in a silo bag (d), of the type comprising a winding tube (10) driven by rotation and which is mounted on support arms (11) hinged to a wheeled (2) frame (1) and wherein the product extractor device (b) is a continuous conveyor structure having a lower loading part (5) substantially horizontally and transversely positioned within the bag-silo (d). From the discharge end, the silo-bag wall (d) is cut with two lateral longitudinal cuts, being the wall divided into an upper part (d1) and a lower one (d2). The winding tube (10), draws by rotation and by the corresponding end the upper half portion (d1) of the silo bag (d). A second winding tube (20) is mounted underlying and parallel to the first tube (10) through support and positioning means (30) and though a mechanical transmission (40). The second winding tube (20) draws by rotation and by the same end, the lower half part (d2) of the silo bag (d). It is thus achieved that the extractor device (b) only draw the product (c) in good condition, while the lower layer of the spoiled product (c1), is drawn by the lower part (d2) of the bag wall and then discarded through the open end of the bag.

13 Claims, 2 Drawing Sheets

MECHANICAL DISCHARGER COMBINED WITH AN EXTRACTOR DEVICE FOR BULK PRODUCT STORED IN SILO-BAGS

FIELD OF THE INVENTION

The present invention relates to a new mechanical discharger combined with an extractor device for bulk product stored in silo-bags, which allows to separate the disposable merchandise that may be ensiled.

BACKGROUND OF THE INVENTION

The storage system of grains in the so-called silo-bags is a technique that has gained great importance in recent times. As known, these are plastic bags of approximately 250 microns thick with different diameters and lengths, which are provided in the form of a tube. For example, a bag of 2.74 meters in diameter and 60 meters in length can contain 200 tons of corn.

During silage, an end of the bag is closed by the heat-sealing technique or simply by folding that end of the tube. The bag is opened as it fills and once the bag is complete, the opposite end is closed by any of the above-mentioned techniques.

A problem that has not been solved so far is the one derived from deterioration or rupture of the bottom or lower part of the silo-bag wall that comes in contact with the soil. This defect allows moisture to enter the silo-bag, causing the merchandise located in the lower part to be damaged or decomposed.

At present, the devices used for the extraction of the grains work according to one of the following combinations:
  The bag is cut manually with different elements (i.e. knife) to later extract its contents by means of some mechanical or pneumatic device.
  The device has cutting mechanisms that open the bag longitudinally as the machine advances removing the grains.

A known mechanical discharger essentially includes a winding tube which is operatively associated with driving means of the rotary movement and which is mounted on support arms hinged to a wheeled frame containing elements for coupling and connecting to the power take-off of a towing vehicle. In the wall of the silo-bag, at one end, an upper longitudinal cut is made by which the product extractor device is inserted, and the winding tube pulls through that end by winding the wall of the silo-bag as the extraction of the product takes place.

In a machine of the preferred embodiment, the product extractor device is a continuous conveyor structure mounted on the machine frame, having a lower loading part substantially horizontally and transversely positioned within the bag-silo, and a part substantially oblique to the vertical, having a top discharge end in the cargo box of a loading vehicle.

From the information provided so far, prior art systems do not separate the spoiled grains, which contributes to lower the quality of the product being discharged and, in many cases, to render the load unusable.

Taking into account the current state of the art, a mechanical discharger of the type already explained is proposed, with the difference that two longitudinal lateral cuts are made in the wall of the silo-bag, being the wall divided into an upper part and a lower part. The end of the upper half portion is held and drawn by rotation by the winding tube which is articulately mounted on the frame support arms; in addition, a second winding tube has been incorporated, which is mounted underlying and parallel to the first winding tube, acting in synchronized form to hold the lower half portion of the silo-bag drawing it by rotation.

This improvement allows the substantially horizontal lower part of the extractor device to act only on the part of the product which is in good condition, while the lower layer of the spoiled product is drawn by the lower part of the bag wall as it is drawn by the lower winding tube and discarded through the open end of the bag.

Other features and advantages of the object of the present invention will be explained in the following description.

BRIEF DESCRIPTION OF THE DRAWINGS

In view of the aforementioned and other related purposes, the invention consists in the details of construction and combination of parts, as will be understood on the basis of the following description referring to the drawings included herein, where.

In these figures, the same reference signs indicate equal or corresponding parts.

Figure 1:
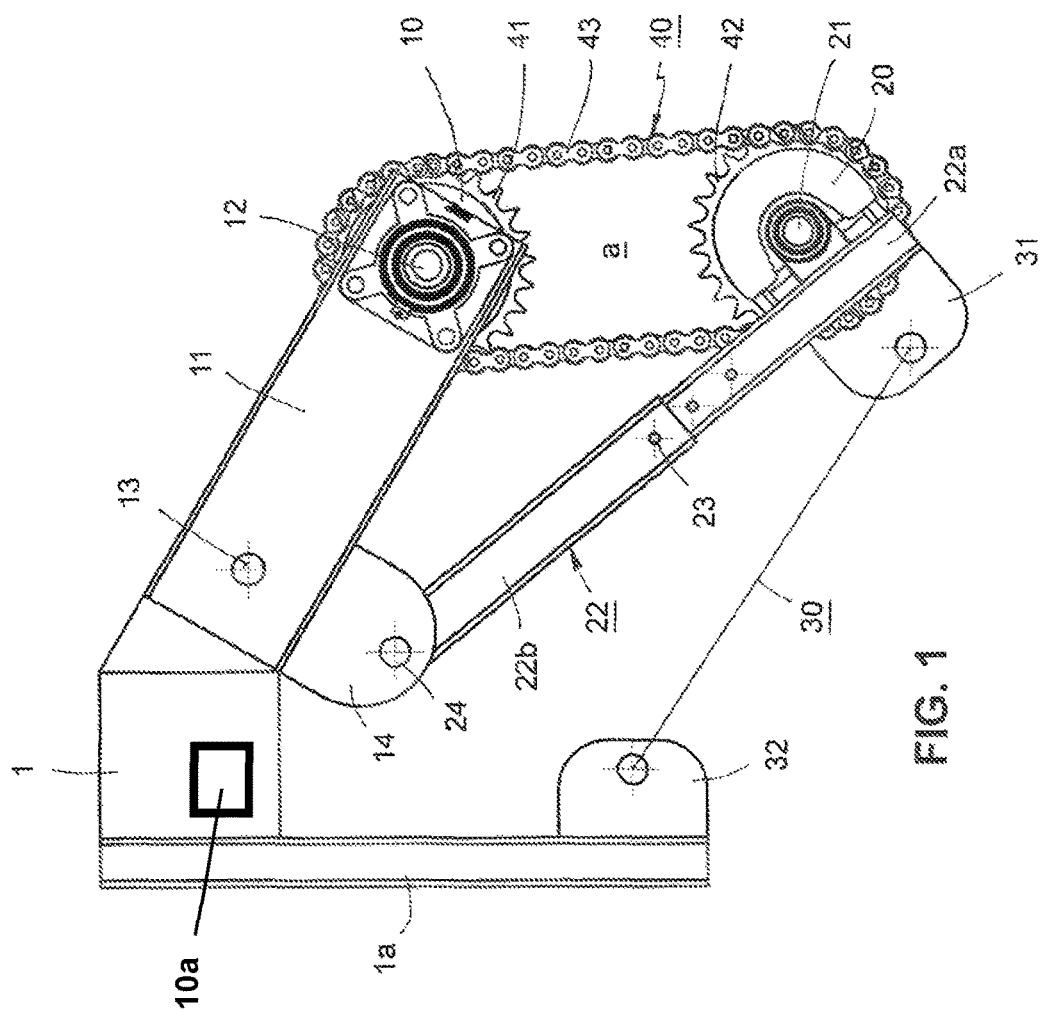
FIG. 1 is a side view schematically showing the mechanical discharger of the present invention.

LIST OF MAIN REFERENCES (a) Mechanical Discharger.
(b) Extractor device.
(c) Ensiled product in good condition.
(c1) Lower layer of the spoiled ensiled product.
(d) Silo-bag.
(d1) Upper half part of the silo-bag (d).
(d2) Lower half part of the silo-bag (d).
(1) Frame.
(1a) Extension of the frame.
(2) Wheels.
(3) Coupling elements and connections (towing bar) of the frame (1).
(4) Towing vehicle (tractor).
(5) Horizontal lower part of the mechanical conveyor.
(6) Vertical part of the mechanical conveyor.
(10) Upper winding tube.
(10a) Rotary driving element
(11) Support-arms of the winding tube (10).
(12) Bearings of the winding tube (10).
(13) Hinge of each arm (11) with the frame (1).
(14) Flange of the support arm (11) adjacent to the hinge (13).
(20) Lower winding tube.
(21) Winding tube bearings (20).
(22) Extendable arms.
(22a) Straight member of each arm (22).
(22b) Straight member of each arm (22).
(23) Detachable fixed joint of members (22a-22b).
(24) Hinge of the end of the member (22b) in the flange (14) of the support arm (11).
(30) Tensor.
(31) Flange of hinge fixed to the end of the member (22a).
(32) Flange of hinge fixed to the extension (the) of the frame (1).
(40) Mechanical transmission.
(41) Pinion of the winding tube (10).

(42) Pinion of the winding tube (20).
(43) Chain.

DETAILED DESCRIPTION OF THE INVENTION

For the specified purposes, a mechanical discharger (a) is proposed combined with an extractor device (b) of the bulk product (c) stored in a silo bag (d), wherein the wall of the end of the bag (d) is longitudinally cut, and of the type comprising a winding tube (10) which is operatively associated with driving element (10a) of the rotary movement and which is mounted on support arms hinged to a wheeled frame containing elements for coupling and connecting (3) to the power take-off of a towing vehicle (4), and wherein the product extractor device (b) is a continuous conveyor structure mounted on said frame (1), having a lower loading part (5) substantially horizontally and transversely positioned within the bag-silo (d), and a part (6) substantially oblique to the vertical, having a top discharge end in the cargo box of a loading vehicle. According to the present invention, the silo-bag wall (d) has two lateral longitudinal cuts, being the wall divided into an upper part (d1) and a lower one (d2). The winding tube (10), which is articulately mounted on the frame supports (1), secures and draws by rotation and by the corresponding end the upper half portion (d1) of the silo bag (d), including a second winding tube (20) which, acting synchronously with the first tube (10), takes the lower half part (d2) of the silo bag (d) by the same end, wherein said second winding tube (20) is mounted underlying and parallel to the first tube (10) through support and positioning means (30) with the frame (1) and with said first winding tube (10).

Figure 2:
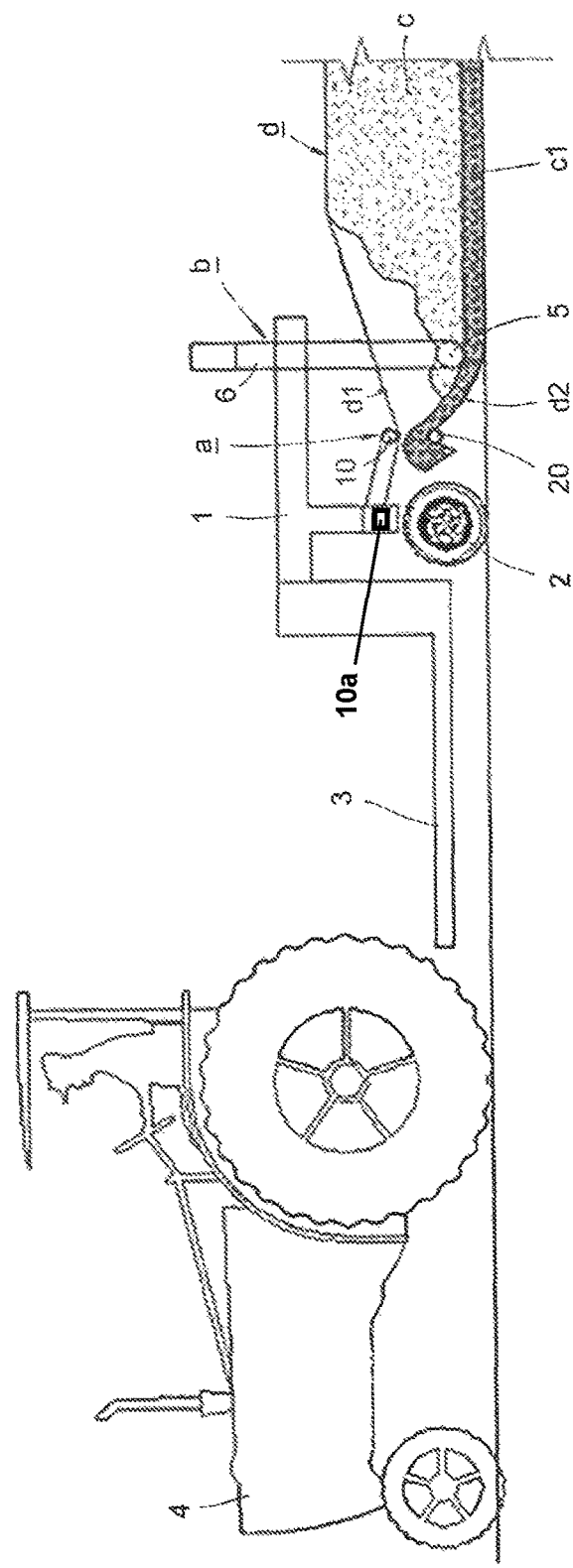
FIG. 2 is a side view schematically showing the discharger in a working position, in combination with the extractor device of the bulk product stored in the silo bag, both being applied to a connected to a towing vehicle.

With reference to FIG. 2, the present mechanical discharger (a) is schematically shown in a working position, schematically showing it, adapted to the frame (1) of the agricultural machine, combined with the extractor device (b) of the bulk product (c) ensiled in the bag (d).

The frame (1) is selected from the known structures, is provided with wheels (2) and a towing bar (3) with means for coupling and connecting to the power take-off of a towing vehicle (4).

The extractor device (b) also comprises a typical continuous worm conveyor structure having a lower loading part (5) substantially horizontally and transversely positionable within the silo bag (d) and a part (6) oblique with the vertical one, which upper end is oriented to discharge in the cargo box of a loading vehicle (not shown).

The application of the discharger (a) requires the initial cutting of the end of the wall of the silo-bag (d), making two longitudinal lateral cuts, this wall being divided into an upper part (d1) and a lower one (d2).

The cuts can be made manually or by side blades (not shown) adapted to the machine structure.

Referring to FIG. 1, the mechanical discharger (a) includes a first winding tube (10) which is operatively associated with rotatable driving element (10a) selected from the known, driven from the power take-off of the vehicle (4), and a second parallel and underlying winding tube (20) which rotates synchronously with the first tube (10).

The first winding tube (10) acts securing and drawing by rotation the upper half part (d1) of the silo bag (d) through the corresponding end, while the second winding tube (20) secures and draws by rotation the lower half part (d2) of the bag (d) through the same end.

The winding tube (10) is mounted on lateral support arms (11) through respective bearings (12), and said arms (11) are joined to the frame (1) by joint bolts (13).

The second winding tube (20) is attached by support and positioning means (30) with the frame (1) and with said first winding tube (10).

The second winding tube (20) has its ends mounted, by means of the corresponding bearings (21), in their extendable arms (22), which have respective longitudinal register means (23). Each arm (22) may be comprised of two straight profiled members (22a) and (22b) attached at the concurrent ends, for example by a detachable bolt-type registration joint (23).

In each arm (22), the bearing (21) is attached to the distal end of the member (22a), while the distal end of the member (22b) is hinged in (24) to a flange (14) of the corresponding upper support arm (11). The hinge (24) is located adjacent to hinge (13) between the respective upper support arm (11) and the frame (1).

At least one of these extensible arms (23), and preferably both, has the mounting end of the lower winding tube articulately connected through a respective tension means (30), with a fixed part of the frame (1), at a point underlying the hinge point (13) of the corresponding support arm (11) of the upper winding tube (10), thus forming an articulated parallelogram arrangement.

In more detail, the tension means (30) is selected between known chain mechanisms and plate mechanisms. In each arm (22), one end of the tension means (30) is hinged to a flange (31) joined with the end of the member (22a), and the opposite end is hinged to a second flange (32) joined to an extension (the) of the frame (1).

As already mentioned, the second winding tube rotates in synchronization with the first tube (10), to which end, these tubes are bound by at least one mechanical transmission (40) placed at least in one of the coincident ends of both winding tubes. The transmission (40) is formed by pinions (41) and (42) respectively mounted on tubes (10) and (20) and the transmission chain (43).

As can be seen from the scheme of FIG. 2, the synchronized action of the winding tubes (10) and (20) causes simultaneous drawing of the upper and lower wall parts (d1) and (d2) of the silo bag (d). The lower part (6) of the conveyor (b) acts extracting only the mass of grains (c) which is in good condition, while the displacement of the lower wall part (d1) draws the layer of damaged grains (c1) towards the open end of the bag (d), preventing them from being taken by the extractor.

The invention claimed is:

1. An apparatus for a mechanical product discharger combined with an extractor device for a product stored in a silo bag with one end longitudinally opened, the product discharger is a continuous conveyor structure with a lower loading part substantially horizontally and transversely positioned within the silo bag, and an upper loading part inclined with respect to the ground with a top discharge end in the cargo box of a loading vehicle, said apparatus comprises:
   an upper winding tube;
   a lower winding tube positioned below said upper winding tube so that a separation space is provided between both winding tubes; and
   a tension element coupled to said lower winding tube to maintain said separation space and prevent contact between both winding tubes, said lower winding tube being configured to support, secure and draw a lower part of a silo bag and said upper winding tube being configured to support, secure and draw an upper part of said silo bag so that said lower part and said upper part are synchronously wound over said lower winding tube and said upper winding tube, respectively, when said upper and lower winding tubes are rotated.

2. The apparatus of claim 1, wherein the lower and upper winding tubes are synchronously rotated by at least one mechanical transmission coupling an end of said upper winding tube to an end of said lower winding tube.

3. The apparatus of claim 2, wherein said at least one mechanical transmission comprises a pinion and chain mechanism.

4. The apparatus of claim 1, wherein said silo bag has lateral longitudinal cuts dividing said bag into said lower part and said upper part.

5. The apparatus of claim 1, further comprising a support arm having a mounting end where said upper winding tube is mounted and an opposing end that is hinged to a frame.

6. The apparatus of claim 5, further comprising an extensible arm having a mounting end where said lower winding tube is mounted and an opposing end that is hinged to said support arm.

7. The apparatus of claim 6, wherein the opposing end of said extensible arm is hinged to said support arm in a position adjacent to a position where the opposing end of said support arm is hinged to said frame.

8. The apparatus of claim 7, wherein the mounting end of said extensible arm is further attached to said frame at a position below a position where the opposing end of said support arm is hinged to said frame.

9. The apparatus of claim 8, wherein the mounting end of said extensible arm is attached to said frame by said tension element.

10. The apparatus of claim 9, wherein said tension element comprises one of: a chain mechanism and a plate mechanism.

11. The apparatus of claim 6, wherein said extensible arm comprises two straight profiled members detachably coupled at joining ends.

12. The apparatus of claim 1, further comprising a rotary driving element operatively associated with said upper winding tube.

13. The apparatus of claim 12, further comprising a frame having a towing bar with coupling and connecting elements configured to connect said rotary driving element to a power take-off of a towing vehicle.

* * * * *